(12) United States Patent
Pasula et al.

(10) Patent No.: US 12,248,668 B2
(45) Date of Patent: Mar. 11, 2025

(54) RANDOMIZED MOVEMENT CONTROL

(71) Applicant: Supercell Oy, Helsinki (FI)

(72) Inventors: Markus Pasula, Helsinki (FI); Jaakko Iisalo, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 17/741,909

(22) Filed: May 11, 2022

(65) Prior Publication Data

US 2023/0367463 A1 Nov. 16, 2023

(51) Int. Cl.
G06F 3/04845 (2022.01)

(52) U.S. Cl.
CPC .................. G06F 3/04845 (2013.01)

(58) Field of Classification Search
CPC .............. G06F 3/04845; G06F 3/0484; G06F 3/0486
USPC ......................................................... 715/769
See application file for complete search history.

(56) References Cited

U.S. PATENT DOCUMENTS

| 8,366,532 B1* | 2/2013 | Nicely ............... | G07F 17/3213 463/31 |
| 9,993,923 B2* | 6/2018 | Terada ................ | G05D 1/0214 |
| 2004/0176936 A1* | 9/2004 | Ohtsu ................. | G09B 19/167 703/8 |
| 2005/0216181 A1* | 9/2005 | Estkowski ............ | G08G 1/166 340/995.23 |
| 2005/0261886 A1* | 11/2005 | Kagarlis ............... | G06F 30/20 703/22 |
| 2006/0135237 A1* | 6/2006 | Tsuda .................. | A63F 13/56 463/9 |
| 2006/0149465 A1* | 7/2006 | Park ................... | G05D 1/0217 701/416 |

(Continued)

FOREIGN PATENT DOCUMENTS

| EP | 1078665 | 2/2001 | |
| WO | WO-2012084614 A1 * | 6/2012 | ............. G06N 3/006 |

OTHER PUBLICATIONS

Richter et al., "Tracking Multiple Extended Objects—a Markov Chain Monte Carlo Approach", 14th International Conference on Information Fusion, IEEE, published on Jul. 1, 2011 (Year: 2011).*

(Continued)

*Primary Examiner* — Hwei-Min Lu
(74) *Attorney, Agent, or Firm* — Ziegler IP Law Group, LLC.

(57) ABSTRACT

A computer-implemented method includes generating and displaying graphical user interface on a display screen of apparatus; receiving a request to move at least one group of objects to a target area on the graphical user interface, and detecting when at least one obstacle lies in a path between the target area and at least one group of objects. When it is detected that at least one obstacle lies in the path, instructions are generated to control the movement of objects of the at least one group in a randomized manner. The instructions indicate at least one random variable parameter to be employed during the movement of a given object in at least one group. The instructions are executed to control the movement of the objects of the at least one group from their respective starting locations to a target area on the graphical user interface.

19 Claims, 7 Drawing Sheets

(56) References Cited

U.S. PATENT DOCUMENTS

| | | | |
|---|---|---|---|
| 2006/0224304 A1* | 10/2006 | Hudson, Jr. | G05B 19/4061 |
| | | | 701/433 |
| 2009/0306946 A1 | 12/2009 | Badler et al. | |
| 2015/0231501 A1* | 8/2015 | Antimary | A63F 13/822 |
| | | | 463/31 |
| 2018/0180428 A1* | 6/2018 | Grimm | G08G 3/02 |
| 2018/0246529 A1* | 8/2018 | Hu | G05D 1/0038 |
| 2019/0011921 A1* | 1/2019 | Wang | G06T 7/246 |
| 2019/0051198 A1* | 2/2019 | Nimmagadda | G05D 1/0217 |
| 2019/0303658 A1* | 10/2019 | Ando | G06V 40/25 |
| 2020/0198140 A1* | 6/2020 | Dupuis | G01C 21/20 |
| 2021/0240203 A1* | 8/2021 | Ha | G05D 1/0295 |

OTHER PUBLICATIONS

Oliveira et al., "Robotic swarms coordination strategies for minimizing group target congestion", 2017 Latin American Robotics Symposium (LARS) and 2017 Brazilian Symposium on Robotics (SBR), Nov. 2017, pp. 1-6. (Year: 2017).*

Wang et al., "Improved Multi-Agent Reinforcement Learning for Path Planning-Based Crowd Simulation", IEEE Access, vol. 7, Jun. 5, 2019, pp. 73481-73855. (Year: 2019).*

Liu et al., "Diversified Crowd Evacuation Method in Large Public Places", IEEE Access, vol. 7, Oct. 2, 2019, pp. 144874-144884. (Year: 2019).*

Abadeer et al., "Distributed Simulation of Crowds with Groups in CrowdSim", 2019 IEEE/ACM 23rd International Symposium on Distributed Simulation and Real Time Applications (DS-RT), Oct. 2019. (Year: 2019).*

Entagma, Naive Path Finding, Dec. 26, 2019, XP No. 93065989, URL https://www.youtube.com/watch?v=PXbBhsJyEdk; https://www.youtube.com/watch?v=PXbBhsJyEdk.

European Patent Office, International Search Report, PCT/FI2023/050202, Mailed Aug. 3, 2023, 19 pages.

Jiaping Ren et al, Simulating Flying Insects Using Dynamics and Data-Driven Noise Modeling to Generate Diverse Collective Behaviors, DOI:10.1371{ioumol.pone-0155698, Published May 17, 2016.

Jur Van Den Burg et al, Reciprocal n-body Collision Avoidance, "Robotics Research", Jan. 1, 2011 (Jan. 1, 2011), Springer Berlin Heidelberg, Berlin, Heidelberg, XP093065499, ISSN: 1610-7438, ISBN: 978-3-642-19457-3,vol. 70, pp. 1-16, DOI: 10.1007/978-3-642-19457-3_1.

Kamphuis A et al: "Finding paths for coherent groups using clearance", Computer Animation; [ACM SIGGRAPH Symposium on Computer Animation], Eurographics Association, P. 0. Box 16 Aire-La-Ville CH-1288 Switzerland, Aug. 27, 2004 (Aug. 27, 2004), pp. 19-28, XP058329450, ISSN: 1727-5288, DOI: 10.1145/1028523.1028526, ISBN: 978-1-58113-659-3.

* cited by examiner

RANDOMIZED MOVEMENT CONTROL

TECHNICAL FIELD

The present disclosure relates to a computer-implemented method incorporating randomized movement control. The present disclosure also relates to an apparatus incorporating randomized movement control. The present disclosure also relates to a system incorporating randomized movement control.

BACKGROUND

Generally, the graphical user interface for software applications that involve movement of objects from one position to another, the path therebetween having one or more obstacles, may present scenarios of an unpleasant user experience. One such scenario comprises overlapping a plurality of objects one over another while moving the plurality of objects from one position to another, when the objects pass through a space between two or more obstacles or circumvent the obstacles.

Typically, to perform such function with a graphical user interface, one way is to allow all the objects to pass around (namely circumvent) an obstacle or to pass through a narrow passage between two or more obstacles all at once. However, this results in generating a graphical user interface where the objects are rendered on top of one another (in an overlapping manner), or where some objects get stuck around the obstacles. Thus, it prevents the efficient movement of a group of objects to a target area when one or more obstacles are present in a path to the target area. Additionally, this leads to an unpleasant and unrealistic user interface, which breaks the immersion of the user. For example, in case of a simulator that simulates movement of vehicles (namely, a traffic simulator) in a track, the movable objects or the vehicles would appear on top of each other. Moreover, such movement of multiple objects may overload the computing resources of the system and increase computational power thereof.

In other conventional systems, a user is required to provide separate requests to move individual objects of the at least one group; this makes the user's input complex and cumbersome. Moreover, the user may also be required to provide input regarding how to move the objects one by one towards the target area. This greatly increases the computing load on the system.

Therefore, in light of the foregoing discussion, there exists a need to overcome the aforementioned drawbacks associated with the conventional movement control of objects.

SUMMARY

The present disclosure seeks to provide a computer-implemented method incorporating randomized movement control. The present disclosure also seeks to provide an apparatus incorporating randomized movement control. The present disclosure also relates to a system incorporating randomized movement control. An aim of the present disclosure is to provide a solution that overcomes at least partially the problems encountered in prior art.

In a first aspect, an embodiment of the present disclosure provides a computer-implemented method comprising:
   generating and displaying a graphical user interface on a display screen of an apparatus;
   receiving a request to move at least one group of objects to a target area on the graphical user interface;
   detecting when at least one obstacle lies in a path between the target area and the at least one group of objects;
   when it is detected that the at least one obstacle lies in the path, generating instructions to control movement of the objects of the at least one group in a randomized manner, wherein the instructions indicate at least one random variable parameter to be employed during movement of a given object in the at least one group; and
   executing the instructions to control the movement of the objects of the at least one group from their respective starting locations to the target area on the graphical user interface.

In a second aspect, an embodiment of the present disclosure provides an apparatus comprising:
   a display screen; and
   a processor configured to:
      generate and display a graphical user interface on the display screen;
      receive a request to move at least one group of objects to a target area on the graphical user interface;
      detect when at least one obstacle lies in a path between the target area and the at least one group of objects;
      when it is detected that the at least one obstacle lies in the path, generate instructions to control movement of the objects of the at least one group in a randomized manner, wherein the instructions indicate at least one random variable parameter to be employed during movement of a given object in the at least one group; and
      execute the instructions to control the movement of the objects of the at least one group from their respective starting locations to the target area on the graphical user interface.

In a third aspect, an embodiment of the present disclosure provides a system comprising a server communicably coupled to a plurality of apparatuses of the second aspect, wherein the plurality of apparatuses are collaborating via respective graphical user interfaces, wherein the server is configured to:
   receive, from a given apparatus, a request to move at least one group of objects to a target area on a respective graphical user interface;
   detect when at least one obstacle lies in a path between the target area and the at least one group of objects on the respective graphical user interface;
   when it is detected that the at least one obstacle lies in the path, generate instructions to control movement of the objects of the at least one group in a randomized manner, wherein the instructions indicate at least one random variable parameter to be employed during movement of a given object in the at least one group; and
   send, to the given apparatus, the generated instructions, wherein a processor of the given apparatus is configured to execute the instructions to control the movement of the objects of the at least one group from their respective starting locations to the target area on the graphical user interface.

In a fourth aspect, an embodiment of the present disclosure provides a computer program product comprising a non-transitory computer-readable storage medium having computer-readable instructions stored thereon, the computer-readable instructions being executable by a computing device comprising processor to execute the method of the aforementioned first aspect.

Embodiments of the present disclosure substantially eliminate or at least partially address the aforementioned problems in the prior art, and enable the movement of the at least one group of objects to the target area to be rendered on the user interface in a randomized manner, without a need for any specific user input regarding how to move the objects, such that there is no overlapping of the objects of the at least one group of objects with each other while moving to the target area therein.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
  generating and displaying a graphical user interface on a display screen of an apparatus;
  receiving a request to move at least one group of objects to a target area on the graphical user interface;
  detecting when at least one obstacle lies in a path between the target area and the at least one group of objects;
  when it is detected that the at least one obstacle lies in the path, generating instructions to control movement of the objects of the at least one group in a randomized manner, wherein the instructions indicate at least one random variable parameter to be employed during movement of a given object in the at least one group; and
  executing the instructions to control the movement of the objects of the at least one group from their respective starting locations to the target area on the graphical user interface.

In a second aspect, an embodiment of the present disclosure provides an apparatus comprising:
  a display screen; and
  a processor configured to:
    generate and display a graphical user interface on the display screen;
    receive a request to move at least one group of objects to a target area on the graphical user interface;
    detect when at least one obstacle lies in a path between the target area and the at least one group of objects;
    when it is detected that the at least one obstacle lies in the path, generate instructions to control movement of the objects of the at least one group in a randomized manner, wherein the instructions indicate at least one random variable parameter to be employed during movement of a given object in the at least one group; and
    execute the instructions to control the movement of the objects of the at least one group from their respective starting locations to the target area on the graphical user interface.

In a third aspect, an embodiment of the present disclosure provides a system comprising a server communicably coupled to a plurality of apparatuses of the second aspect, wherein the plurality of apparatuses are collaborating via respective graphical user interfaces, wherein the server is configured to:
  receive, from a given apparatus, a request to move at least one group of objects to a target area on a respective graphical user interface;
  detect when at least one obstacle lies in a path between the target area and the at least one group of objects on the respective graphical user interface;

when it is detected that the at least one obstacle lies in the path, generate instructions to control movement of the objects of the at least one group in a randomized manner, wherein the instructions indicate at least one random variable parameter to be employed during movement of a given object in the at least one group; and send, to the given apparatus, the generated instructions, wherein a processor of the given apparatus is configured to execute the instructions to control the movement of the objects of the at least one group from their respective starting locations to the target area on the graphical user interface.

In a fourth aspect, an embodiment of the present disclosure provides computer program product comprising a non-transitory computer-readable storage medium having computer-readable instructions stored thereon, the computer-readable instructions being executable by a computing device comprising a processor to execute the method of the aforementioned first aspect.

The present disclosure provides the aforementioned computer-implemented method, the aforementioned apparatus, and the aforementioned system. Embodiments of the present disclosure aim to control the movement of the at least one group of objects in the randomized manner such that there is no accumulation or overlapping of the objects of the at least one group while moving to the target area when at least one obstacle is in the path of the objects. Moreover, as a user does not have to provide separate requests to move individual objects of the at least one group, the user's input is made easier and simplified. In other words, the objects of the at least one group can be moved based on a single request from the user. Furthermore, the user's interaction with the graphical user interface is simplified, due to the randomized control of the movement, because the user need not provide any input regarding how to move the objects towards the target area. Additionally, such a randomized control of the movement potentially reduces the computing load on the apparatus. Moreover, the GUI provides a pleasant and realistic user experience which is free of any undesired visual graphics of the given objects being stuck or overlapping each other while moving towards the target area.

The method of the present disclosure is computer-implemented, that is said method is implemented via one or more computing devices (namely, the apparatus and/or the server). The apparatus refers to an electronic device associated with (namely, used by) a user, that is capable of enabling the user to perform specific tasks thereon (or therewith). Examples of the computing device may include, but are not limited to, a cellular phone, a personal digital assistant (PDA), a handheld device, a laptop computer, a personal computer, and so forth. Optionally, the user may be any entity such as a person (i.e., a human being) or a virtual program (such as, an autonomous program, a software application or a bot) that is associated with and operates the apparatus and/or the server. Notably, the apparatus is configured to provide the graphical user interface on the display screen thereof. Beneficially, the interaction between the user and the apparatus allows an effective operation and control therebetween.

The term "display screen" as used herein refers to the screen of the apparatus. Typically, the display screen is configured to provide visual graphics of the graphical user interface to the user.

The term "graphical user interface" (GUI) as used herein refers to a space where interaction between the user and the apparatus occurs. Typically, the GUI presents one or more spatially distributed elements. Beneficially, the interaction between the user and the apparatus allows effective operation and control therebetween. Moreover, the GUI is designed to allow the user to interact easily, efficiently, and in a user-friendly manner with the apparatus to provide maximum usability, thereby reducing the amount of user input to achieve a desired output.

Typically, the GUI may be composed of one or more layers, including a human-machine interface (HMI) that interfaces machines with physical input hardware such as keyboards, a mouse, a touch screen or a game pad; and output hardware such as a computer monitor, a speaker, a printer, and the like. Moreover, a GUI layer may interact with one or more human senses, and may comprise at least one of: tactile GUI (touch), visual GUI (sight), auditory GUI (sound), olfactory GUI (smell), equilibria GUI (balance), gustatory GUI (taste). Herein, the user interface is composed of the visual GUI and the tactile GUI to display graphics and receive user inputs, respectively. Moreover, the aforementioned user interface, when sound is added to the user interface, becomes a multimedia user interface (MUI).

Herein, the GUI is such that the at least one group of objects are being displayed to the user via the display screen of the apparatus. Subsequently, the GUI receives the request from the user to move the at least one group of objects to the target area on the GUI. Optionally, the target area may be specified by the user or by a processor of the apparatus or a processor of the server. Optionally, the target area is specified by the user for example via a tap of finger over the display screen, where the display screen is in the form of a touch screen. Alternatively, the target area is specified by the user may be via a mouse click. In an implementation, where the user is an automated software application used for simulation purposes, the request for moving the at least one group of objects is received from the automated software application itself along with specifying the target area as well.

The term "processor of the apparatus" as used herein refers to a computational element that is operable to respond to and process instructions given by the user and to control operations of the apparatus. Examples of the processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, one or more individual processors, processing devices and elements are arranged in various architectures for responding to and processing the instructions that drive the apparatus. It will be appreciated that each apparatus is configured to have the processor therein.

The term "server" as used herein refers to a powerful physical or virtual infrastructure that has been virtualized, to perform application- and information-processing storage and enable accessing of the stored information by users remotely over a data communication network. The server includes suitable logic, circuitry, interfaces, and/or code that is configured to store, process and/or receive the information from the apparatus corresponding to the received request. Moreover, in some implementations, the server is configured to provide real-time instructions based on the received request. It will be appreciated that the server may be a cloud server. In addition, the server may be a single server or a plurality of servers operating in a parallel or distributed architecture to operatively couple with the disclosed apparatus or similar systems. Examples of the server include, but is not limited to, a storage server, a web server, an application server, or a combination thereof.

The method comprises detecting when at least one obstacle lies in a path between the target area and the at least one group of objects. Herein, such detecting ensures the effective control of the movement of the at least one group of objects to the target area, such that there is no collision of the at the least one group of objects with the at least one obstacle or no collision and overlapping of the objects of the at least one group of objects, while moving to the target area.

In an implementation, when there may be one obstacle detected in the path between the target area and the at least one group of objects, then the at least one group of objects is moved to the target area by passing around the at least one obstacle to avoid any collision of the at least one group of objects with the at least one obstacle. In another implementation, when there may be two or more obstacles detected in the path between the target area and the at least one group of objects, such that the objects have to pass through a narrow passage between the two or more obstacles while moving to the target area, then it is to be ensured that the at least one group of objects are moved to the target area such that there is no collision or overlapping between the objects of the at least one group of objects while passing through the narrow passage between the two or more obstacles to reach the target area.

In an implementation, when it is detected that no obstacle lies in the path between the target area and the at least one group of object, then each given object of the at least one group of objects moves to the target via a shortest route to the target area.

It will be appreciated that the objects can be user-controllable objects in a game, virtual vehicles in a traffic simulation, or the like. In one embodiment, the objects are autonomous vehicles such as delivery vehicles. In said embodiment, in case of two or more objects arrive in front of a narrow passage between the two or more obstacles, the objects may form at least one group of objects and their start of movement towards the narrow passage may be initiated in the randomized manner, such that there is no collision or overlapping of the objects while moving to the target area via the narrow passage. This way no specific decision tree needs to be formed for embodiments of the present disclosure to work.

Moreover, when it is detected that the at least one obstacle lies in the path, the method comprises generating instructions to control movement of the objects of the at least one group in a randomized manner, wherein the instructions indicate at least one random variable parameter to be employed during movement of a given object in the at least one group. Herein, randomized movement of the objects of the at least one group of objects prevents accumulation of one or more objects near the at least one obstacle at once. Herein, the term "randomized manner" refers to selection of the objects of the at least one group of objects to move to the target area without being affected by irrelevant variables. In this regard, optionally, the movement of the objects of the at least one group is controlled in the randomized manner irrespective of their closeness to the target area or the at least one obstacle, for example.

Herein, the term "instructions" refers to computer executable commands that can be executed by the processor of the apparatus. It will be appreciated that the instructions may be generated by the processor of the apparatus (such as in a single-user application, for example a single-user game) or by the processor of the server (such as in a multiple-user application, for example a multiple-user game) communicative coupled to the plurality of apparatuses. In an embodiment, a single instruction may be applied to all of the objects of the at least one group of objects. Beneficially, such single instruction prevents a need to generate individual instructions for each of the objects of the at least one group of objects separately. Herein, the "random variable parameter" is a parameter that is associated with a randomization in the movement of a given object. Optionally, the random variable parameter may be randomly selected by the processor of the apparatus or by the processor of the server. Beneficially, the random selection of the random variable parameter by the server helps in reducing the load on the processor of the apparatus as all the calculations are being performed at the server.

Optionally, the at least one random variable parameter comprises at least one of: a starting time at which the given object is to move, a speed with which the given object is to move, a direction in which the given object is to start moving, an initial distance to be covered by the given object in said direction. It will be appreciated that as the random variable parameter is generated randomly, it is highly unlikely that two objects would have a same value of the random variable parameter. As a result, no object collides or overlaps with each other when moving towards the target area. Furthermore, the user's interaction with the graphical user interface is simplified, due to the randomized control of the movement, because the user need not provide any input regarding how to move the objects towards the target area.

Optionally, the at least one random variable parameter comprises a starting time at which the given object is to move, and wherein the method further comprises randomly selecting the starting time to begin within a predefined time period from a predefined time (t0). In this regard, each of the given object in the at least one group of objects is randomized to a have different starting time, i.e. a time at which the given object starts to move to the target area, thus ensuring that there is no accumulation of the given objects of the at least one group near the at least one obstacle detected while moving to the target area. The term "predefined time" (t0) as used herein refers to a reference instance of time from which the predefined time period is calculated. Optionally, the predefined time (t0) may be a time instance at which the request is provided by the user or may be a time instance at which a first object starts the movement to the target area. Subsequently, the starting time of the given object is randomly selected to lie within the predefined time period from the predefined time (t0). Optionally, a length of the predefined time period may lie in a range from 0.1 to 1.0 second. As an example, the starting time may be selected to be at 0.1 second from the predefined time (t0) for an $n^{th}$ object, while the starting time may be selected to be at 0.3 second from the predefined time (t0) for an n+1th object. As another example, the starting time of the given object is selected to be t0+0.5 seconds, where t0 is the predefined time at which the request from the user was received and the +0.5 seconds is selected as the random variable parameter for the given object; in such a case, the given object would start to move towards the target area at time t0+0.5 seconds. Optionally, the random selection of the starting time of the given object may be done by the processor of the apparatus or by the server. In this way, the user's interaction with the graphical user interface is simplified, due to the randomized control of the movement, because the user need not provide any input regarding different starting times when the objects are to start moving towards the target area. Additionally, such a randomized control of the movement potentially reduces the computing load on the apparatus, as the apparatus neither needs to collect and process separate inputs regarding the different starting times, nor needs to employ any rules to determine the starting times.

Additionally or alternatively, optionally, the at least one random variable parameter comprises a speed with which the given object is to move, and wherein the method further comprises randomly selecting the speed from a predefined range of speeds. In this regard, the starting time of movement may be same for each of the given object, but an initial speed could be a random variation from an average speed for the objects of the at least one group of objects. As an example, the average speed of movement of an object may be 100 pixels per second; in such a case, the predefined range of speeds may be from 70 pixels per second to 130 pixels per second. Moreover, each of the given object in the at least one group is randomized to have a different speed, i.e., a speed with which the given object starts to move towards the target area, thus ensuring that there is no accumulation of the given objects of the at least one group near the at least one obstacle detected while moving to the target area. The term "predefined range of speeds" as used herein refers to a reference range of speeds from which the speed is randomly selected. For example, the speed with which a first given object, a second given object and a third given object of the at least one group move may be randomly selected to be 80 pixels per second, 100 pixels per second and 130 pixels per second, respectively. Optionally, the random selection of the speed with which the given object is to move may be done by the processor of the apparatus or by the server. Beneficially, the user's interaction with the graphical user interface is simplified, due to the randomized control of the movement, because the user need not provide any input regarding different speeds with which the objects are to move towards the target area. Additionally, such a randomized control of the movement potentially reduces the computing load on the apparatus, as the apparatus neither needs to collect and process separate inputs regarding the different speeds, nor needs to employ any rules to determine the speeds.

Yet more additionally or alternatively, optionally, the at least one random variable parameter comprises a direction in which the given object is to start moving, wherein the method further comprises:
for a given object, determining a range of directions in which the given object can start moving, based on relative positions of the target area, the at least one obstacle and remaining objects in the at least one group with respect to the given object; and
randomly selecting the direction in which the given object is to start moving from the range of directions.

In this regard, each of the given object of the at least one group may be randomized to have a separate direction in which the given object is to start moving, thus ensuring that there is no accumulation of the given objects of the at least one group near the at least one obstacle detected while moving to the target area. Moreover, based on the relative positions of the target area, the at least one obstacle and the remaining objects in the at least one group with respect to the given object, the range of directions in which the given object can move may be determined. Subsequently, from the range of directions determined, the direction in which the given object is to start moving is randomly selected. Optionally, the random selection of the direction in which the given object is to move may be done by the processor of the apparatus or by the server. Furthermore, the user's interaction with the graphical user interface is simplified, due to the randomized control of the movement, because the user need not provide any input regarding different directions in which the objects are to start moving. Additionally, such a randomized control of the movement potentially reduces the computing load on the apparatus, as the apparatus neither needs to collect and process separate inputs regarding the different directions, nor needs to employ any rules to determine the directions.

It will be appreciated that in a case when the random selection of the direction of movement is performed, the at least one random variable parameter may also comprise the initial distance to be covered by the given object in said direction. This is because such random selection of the direction could take the given object in a direction that is away from the target area. In such a case, after the initial distance is covered in said direction, a change in the direction of the given object can be implemented to direct the given object towards the target area. Therefore, the method may further comprise randomly selecting the initial distance to be covered by the given object from a predefined range of initial distances. This way some of the objects may not go via the shortest route but will take a detour, thus creating random arrival time of the objects through the narrow passage between the at least one obstacle.

Moreover, optionally, the instructions are generated to control the movement of the objects of the at least one group in a manner that the objects reach the target area in a predefined order. In this regard, the randomization of the movement of the given objects in the at least one group is performed in a manner that, there is a specific order in which the objects of the at least one group reach the target area. In an implementation, the movement of the objects to the target area in the predefined order may be significant, as some objects of the at least one group with higher priority may be required to reach the target area first, whereas other objects of the at least one group with lower priority may be required to reach the target area later. In such a case, the random selection can be performed in sub-ranges (namely, slabs) of the predefined range. As a result, the user's interaction with the graphical user interface is simplified, due to the randomized control of the movement, because the user need not provide any input regarding how to move the objects towards the target area. Additionally, such a randomized control of the movement potentially reduces the computing load on the apparatus.

Furthermore, the method comprises executing the instructions to control the movement of the objects of the at least one group from their respective starting locations to the target area on the graphical user interface. Herein the "respective starting locations" refers to the respective locations of the given objects at the time when the request was received. Subsequently, upon generating the instructions for the objects of the at least one group, the generated instructions are then executed to control the movement of the objects from their respective starting locations to the target area in a randomized manner, which is being displayed to the user via the GUI. Thus, the method ensures that there is no accumulation of the given objects or overlapping of the given objects of the at least one group near the at least one obstacle detected, which is visible on the GUI, while moving to the target area.

Optionally, the method further comprises identifying a main object from amongst the objects of the at least one group, wherein movement of the main object is followed by movement of remaining objects in the at least one group. Herein, the movement of the objects of the at least one group is randomized such that the main object is to reach the target area first and the remaining objects follow the movement of the main object and reach the target area after the main object as per the selected random variable parameter. In such a case, the main object may be considered to be an object having a high priority. Thus, no random variable parameter may be selected for the main object. Moreover, as a user does not have to provide separate requests to move individual objects of the at least one group, the user's input is made easier and simplified. In other words, the objects of the at least one group can be moved based on a single request from the user, such as to follow the main object as a result of randomized control of the movement thereof. Furthermore, the user's interaction with the graphical user interface is simplified, and the computing load on the apparatus is potentially reduced.

In an implementation, where the GUI is of a traffic simulation software and the at least one group of objects is a convoy of cars to be moved to the target area, a particular car is identified as the main object from within the convoy of cars, and the remaining of the cars follow the particular car identified as the main object while moving to the target area. Herein, the convoy of the cars may be randomized to move such that the speed with which the particular car identified as the main object is moving is higher than the speed with which the remaining cars in the convoy of cars will move. Additionally or alternatively, the movement of the particular car may start earlier than the movement of the remaining cars. Beneficially, the main object moves without any distortions and speeds up the movement of the remaining objects. Thus, the car identified as the main object leads the convoy and the remaining cars in the convoy follow the movement of the car identified as the main object.

In an embodiment, the instructions corresponding to the movement of the main object and the remaining objects in the at least one group are received and buffered. The instructions are retrieved from the buffer and executed for the main object and the remaining objects randomly (or based on other rules). This way in software architecture, movement commands can be provided to any number of objects by pointing the command to each of the objects. This is beneficial if each of the objects are architecturally separate and independent from each other.

Optionally, the at least one group of objects comprises a plurality of groups of objects, wherein the method further comprises assigning respective intermediate target areas to the plurality of groups of objects, wherein objects in a given group first reach a respective intermediate target area, and then move from their respective intermediate target area towards the target area. It will be appreciated that in some situations some objects of a first group of objects moving with random variable parameters (start times, directions, speeds and/or distances) towards the target area may be able to go through the narrow passage. In said situation, a second group of objects may be formed for the objects which got stuck in the narrow passage. The movement of the second group of objects may be re-randomized (namely, iteratively randomized) to have new random variable parameters (start times, directions, speeds and/or distances), thus enabling the objects of the second group of objects to pass through narrow passage. Herein, each of the plurality of objects (namely, the objects of the first group and the second group) may be randomized to move to the respective intermediate target area and again randomized to move from the respective intermediate target area to the target area.

Optionally, the method further comprises dividing a plurality of objects being presented on the graphical user interface into the plurality of groups, based on at least one of: a distance of a given object from the target area, a signal strength of a sensor of the given object.

In an implementation, the GUI is of a gaming application, where the at least one group of objects refers to the user's army and the target area refers to the area where an enemy army is positioned. In this regard, the user's army comprises a plurality of troops (namely, plurality of objects), with each of the plurality of troops having a respective striking range. Herein, based on the striking range of the each of the plurality of troops with respect to the target area, the plurality of troops can be divided into different groups, and first moved to their respective intermediate target areas in order to form an optimal defensive formation of the user's army. Subsequently, each of the plurality of troops are then moved from their respective intermediate target area to the target area.

The present disclosure also relates to the apparatus as described above. Various embodiments and variants disclosed above apply mutatis mutandis to the apparatus.

Optionally, at least one random variable parameter comprises at least one of: a starting time at which the given object is to move, a speed with which the given object is to move, a direction in which the given object is to start moving, an initial distance to be covered by the given object in said direction.

Optionally, the at least one random variable parameter comprises a starting time at which the given object is to move, and wherein the processor is further configured to randomly select the starting time to begin within a predefined time period from a predefined time (t0).

Optionally, the at least one random variable parameter comprises a speed with which the given object is to move, and wherein the processor is further configured to randomly select the speed from a predefined range of speeds.

Optionally, the at least one random variable parameter comprises a direction in which the given object is to start moving, wherein the processor is further configured to:
 for a given object, determine a range of directions in which the given object can start moving, based on relative positions of the target area, the at least one obstacle and remaining objects in the at least one group with respect to the given object; and
 randomly select the direction in which the given object is to start moving from the range of directions.

The present disclosure also relates to the system as described above. Various embodiments and variants disclosed above apply mutatis mutandis to the system.

It will be appreciated that the plurality of apparatuses and graphical user interfaces is only used in plural corresponding to the aforementioned apparatus and graphical user interface of the second aspect. Herein the plurality of apparatuses may be collaborating on a same software application managed and served by the server.

Optionally, the at least one random variable parameter comprises at least one of: a starting time at which the given object is to move, a speed with which the given object is to move, a direction in which the given object is to start moving, an initial distance to be covered by the given object in said direction.

Optionally, the at least one random variable parameter comprises a starting time at which the given object is to move, and wherein the server or the processor is further configured to randomly select the starting time to begin within a predefined time period from a predefined time (t0).

Optionally, the at least one random variable parameter comprises a speed with which the given object is to move, and wherein the server or the processor is further configured to randomly select the speed from a predefined range of speeds.

Optionally, the at least one random variable parameter comprises a direction in which the given object is to start moving, wherein the server or the processor is further configured to:
- for a given object, determine a range of directions in which the given object can start moving, based on relative positions of the target area, the at least one obstacle and remaining objects in the at least one group with respect to the given object; and
- randomly select the direction in which the given object is to start moving from the range of directions.

The present disclosure also relates to the computer program product as described above. Various embodiments and variants disclosed above apply mutatis mutandis to the computer program product.

Optionally, the computer program product is implemented as an algorithm, embedded in a software stored in the non-transitory computer-readable storage medium. The non-transitory computer-readable storage medium may include, but is not limited to, an electronic storage device, a magnetic storage device, an optical storage device, an electromagnetic storage device, a semiconductor storage device, or any suitable combination of the foregoing. Examples of implementation of computer-readable storage medium, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory.

Alternative embodiment of the present disclosure provides a computer-implemented method comprising:
- generating and displaying a graphical user interface on a display screen of an apparatus;
- receiving a request to move at least one group of objects to a target area on the graphical user interface;
- generating instructions to control movement of the objects of the at least one group in a randomized manner, wherein the instructions indicate at least one random variable parameter to be employed during movement of a given object in the at least one group; and
- executing the instructions to control the movement of the objects of the at least one group from their respective starting locations to the target area on the graphical user interface. In deed the instructions related to moving objects in randomized manner can be provided in some situations also without prechecking if there at least one obstacle lies in a path between the target area and the at least one group of objects. Benefit of this alternative embodiment is that executable software can be made more simple, in case of if the randomized manner instructions are generated (as default) for received movement request(s).

DETAILED DESCRIPTION OF THE DRAWINGS

Figure 1:
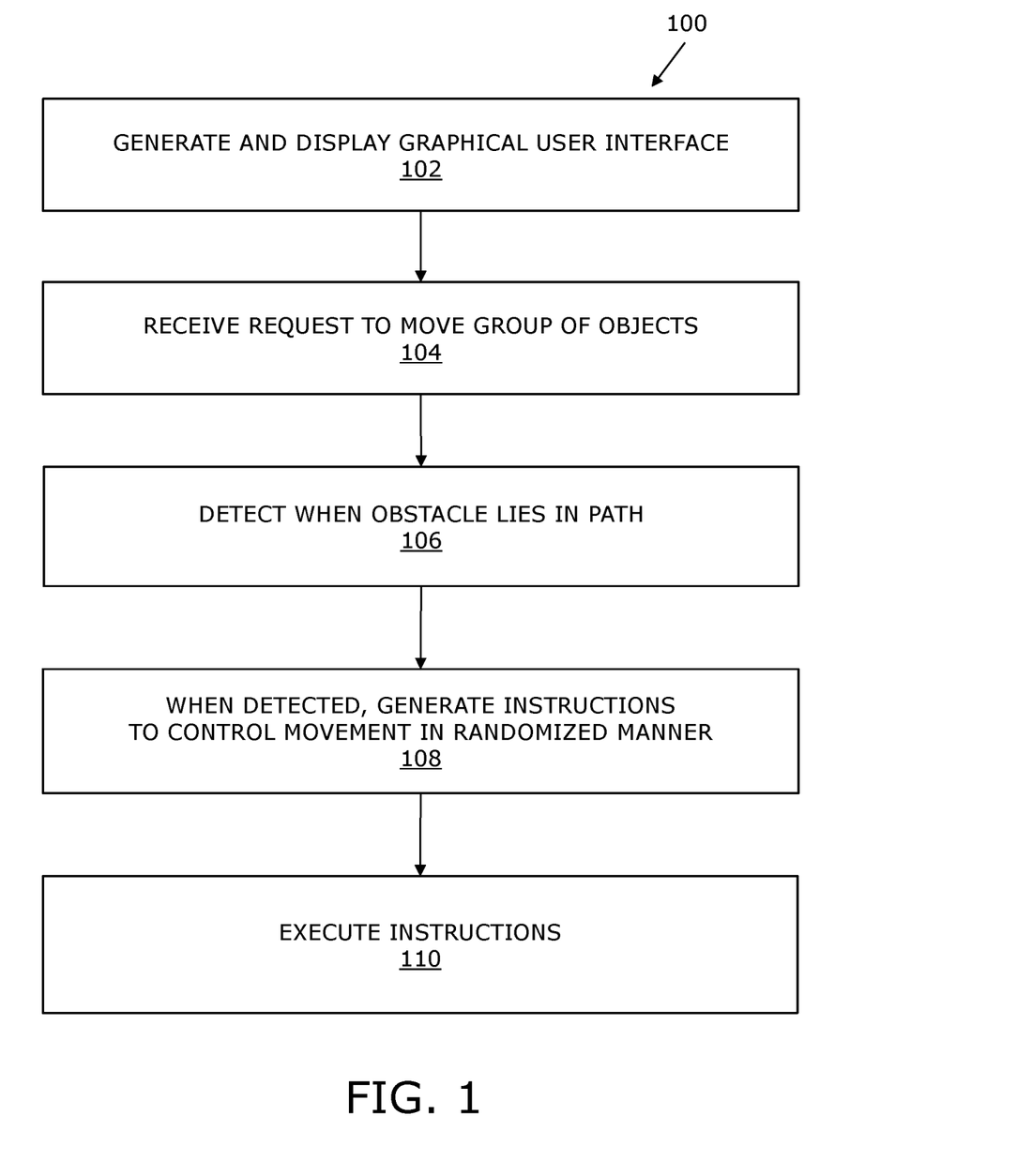
FIG. 1 is a flowchart depicting steps of a computer-implemented method incorporating randomized movement control, in accordance with an embodiment of the present disclosure.

Referring to FIG. 1, illustrated is a flowchart 100 depicting steps of a computer-implemented method incorporating randomized movement control, in accordance with an embodiment of the present disclosure. At step 102, a graphical user interface is generated and displayed on a display screen of an apparatus. At step 104, a request to move at least one group of objects to a target area on the graphical user interface is received. At step 106, when at least one obstacle lies in a path between the target area and the at least one group of objects is detected. At step 108, when it is detected that the at least one obstacle lies in the path, instructions are generated to control movement of the objects of the at least one group in a randomized manner, wherein the instructions indicate at least one random variable parameter to be employed during movement of a given object in the at least one group. At step 110, the instructions to control the movement of the objects of the at least one group from their respective starting locations to the target area on the graphical user interface are executed.

The steps 102, 104, 106, 108 and 110 are only illustrative and other alternatives can also be provided where one or more steps are added, one or more steps are removed, or one or more steps are provided in a different sequence without departing from the scope of the claims herein.

Figure 2A:
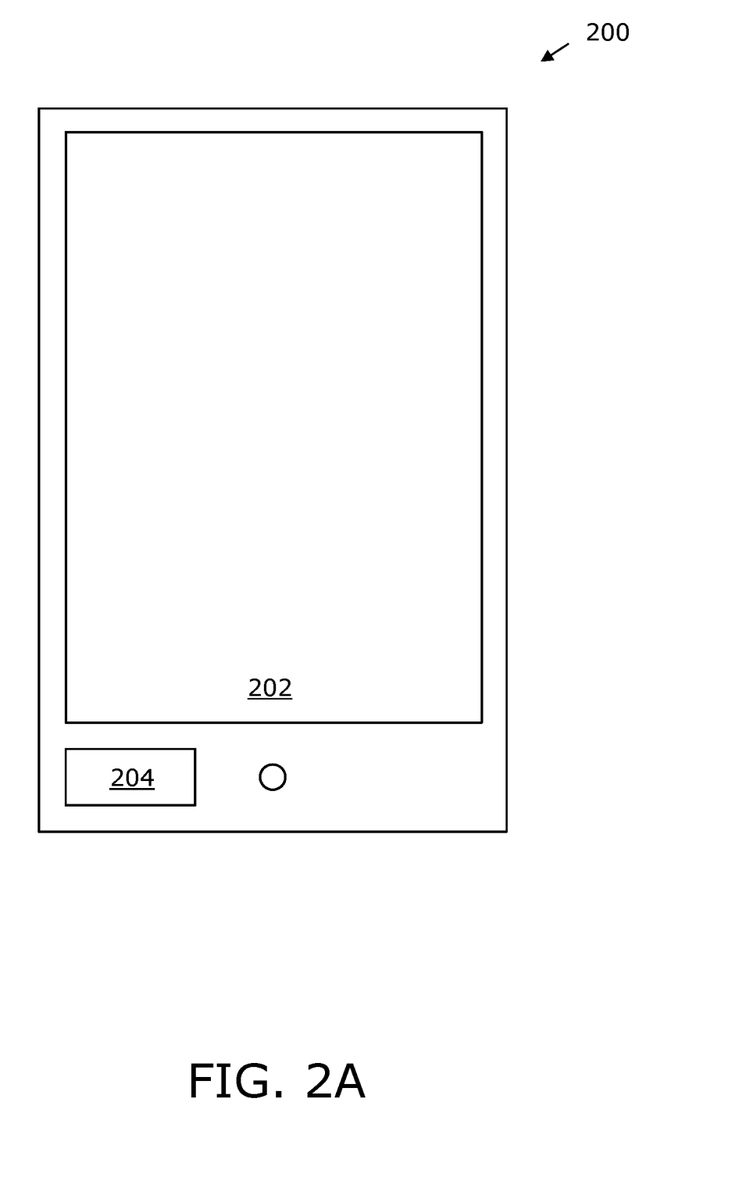
FIGS. 2A and 2B are schematic illustrations of an apparatus incorporating randomized movement control and a graphical user interface of said apparatus, respectively, in accordance with an embodiment of the present disclosure.
Figure 2B:
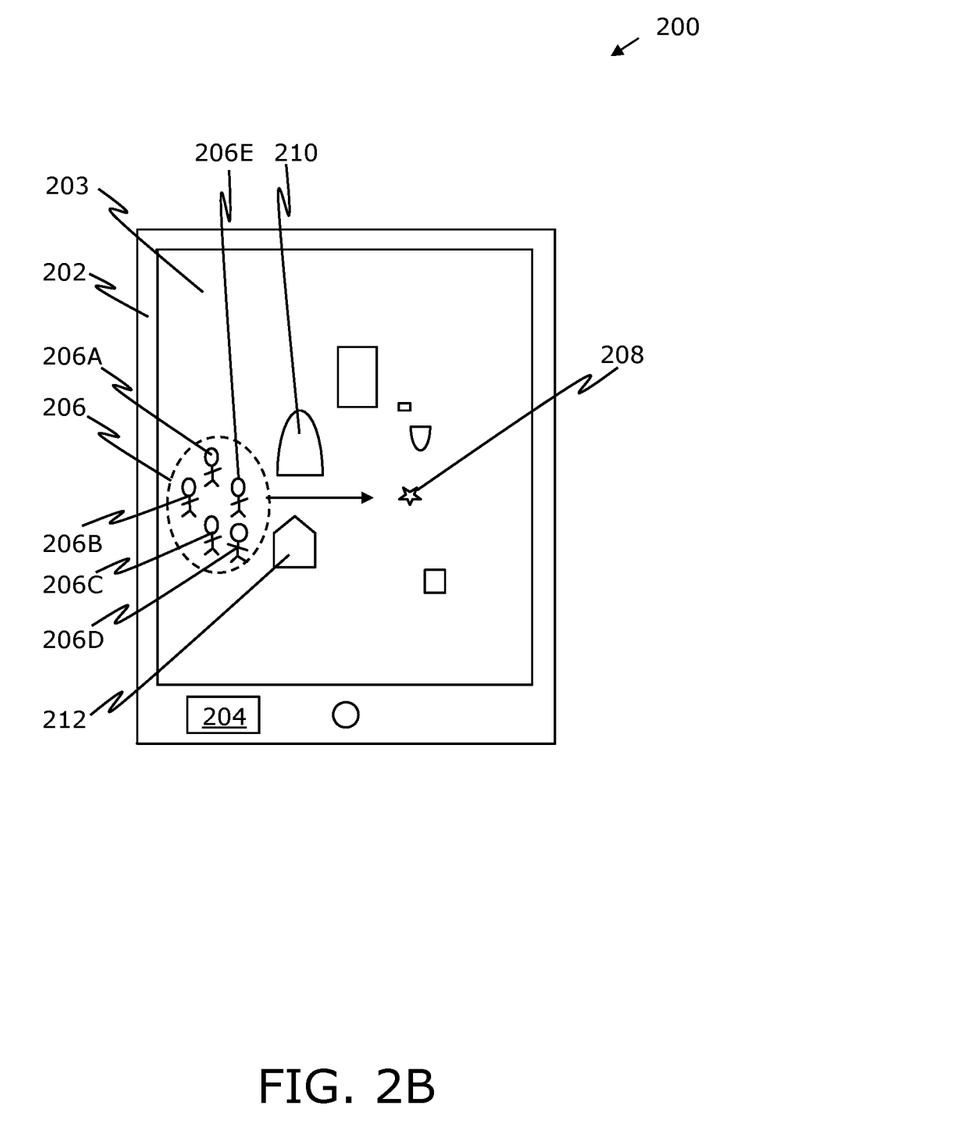

Referring to FIGS. 2A and 2B, illustrated are schematic illustrations of an apparatus 200 incorporating randomized movement control and a graphical user interface 203 of said apparatus 200, respectively, in accordance with an embodiment of the present disclosure. As shown in FIG. 2A, the apparatus 200 comprises a display screen 202 and a processor 204. As shown in FIG. 2B, the display screen 202 of the apparatus 200 renders a graphical user interface 203. Herein, the graphical user interface 203 depicts at least one group of objects 206, where the at least one group of objects 206 comprises objects 206A, 206B, 206C, 206D and 206E. Moreover, the graphical user interface 203 depicts two obstacles 210 and 212, respectively in a path towards the target area 208 such that, there is a narrow passage created between the obstacles 210 and 212 through which the at least one group of objects 206 has to pass to reach the target area 208.

Figure 3:
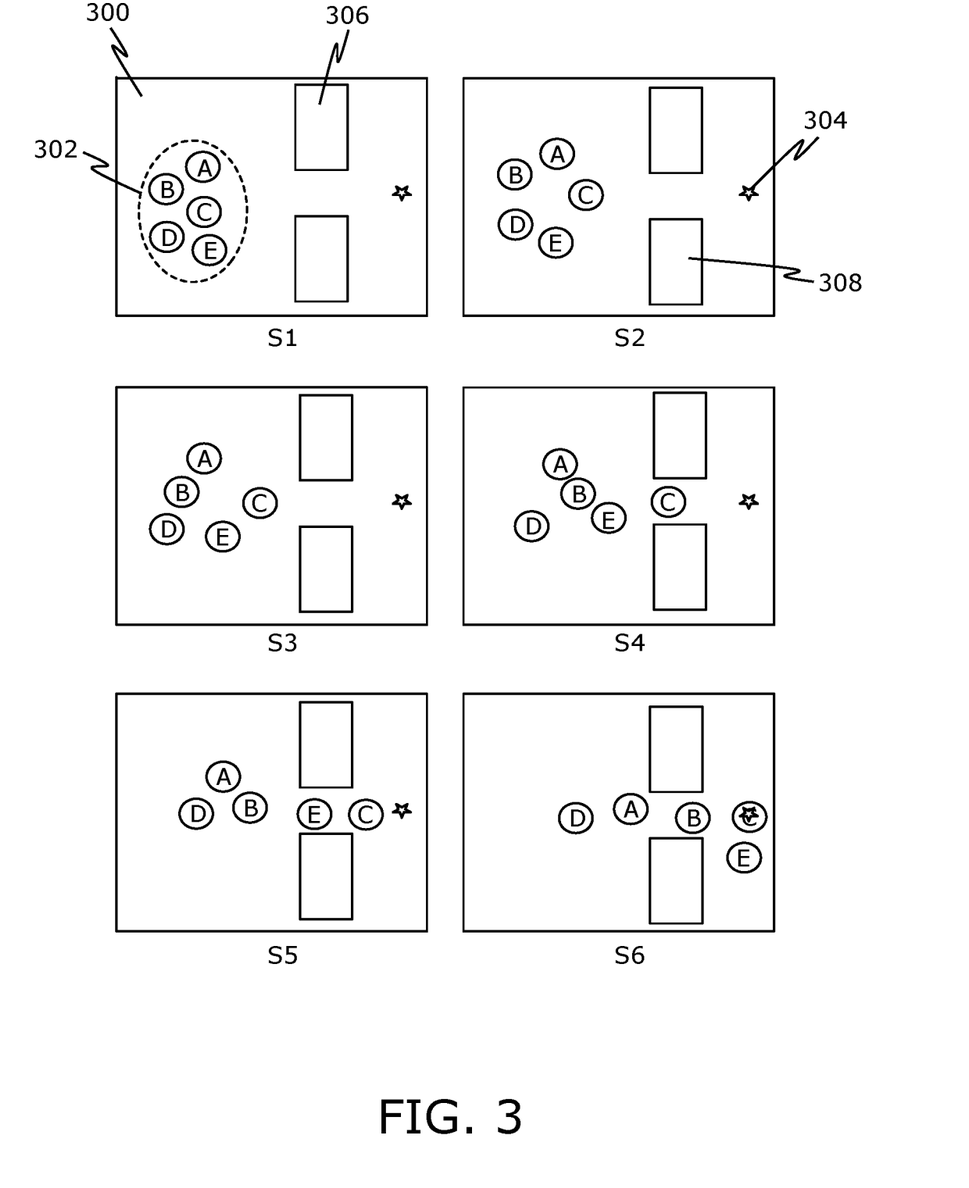
FIG. 3 is a schematic illustration of steps of an implementation scenario of a computer-implemented method incorporating randomized movement control, in accordance with an embodiment of the present disclosure.

Referring to FIG. 3, illustrated is a schematic illustration of steps of an implementation scenario of a computer-implemented method incorporating randomized movement control, in accordance with an embodiment of the present disclosure. As shown, at step S1, a request for moving at least one group of objects 302 to a target area 304 is received via a graphical user interface 300. At step S2, an object C from the at least one group of objects 302 is randomized to start moving to the target area 304 before the other objects (A, B, D and E) of the at least one group 302. At step S3, an object E from the at least one group 302 is randomized to start moving to the target area 304. At step S4, each of the object A, B, C, D and E of the at least one group 302 are randomized to start moving to the target area 304. At step S5, due to the controlling of the movement of the at least one group of objects 302 in the randomized manner, each of the object A, B, C, D and E of the at least one group 302 is moving through a narrow passage between the obstacles 306 and 308, one by one in an organized manner to reach the target area 304. At step S6, each of the object A, B, C, D and E of the at least one group 302 is reaching the target area 304 one by one.

Figure 4:
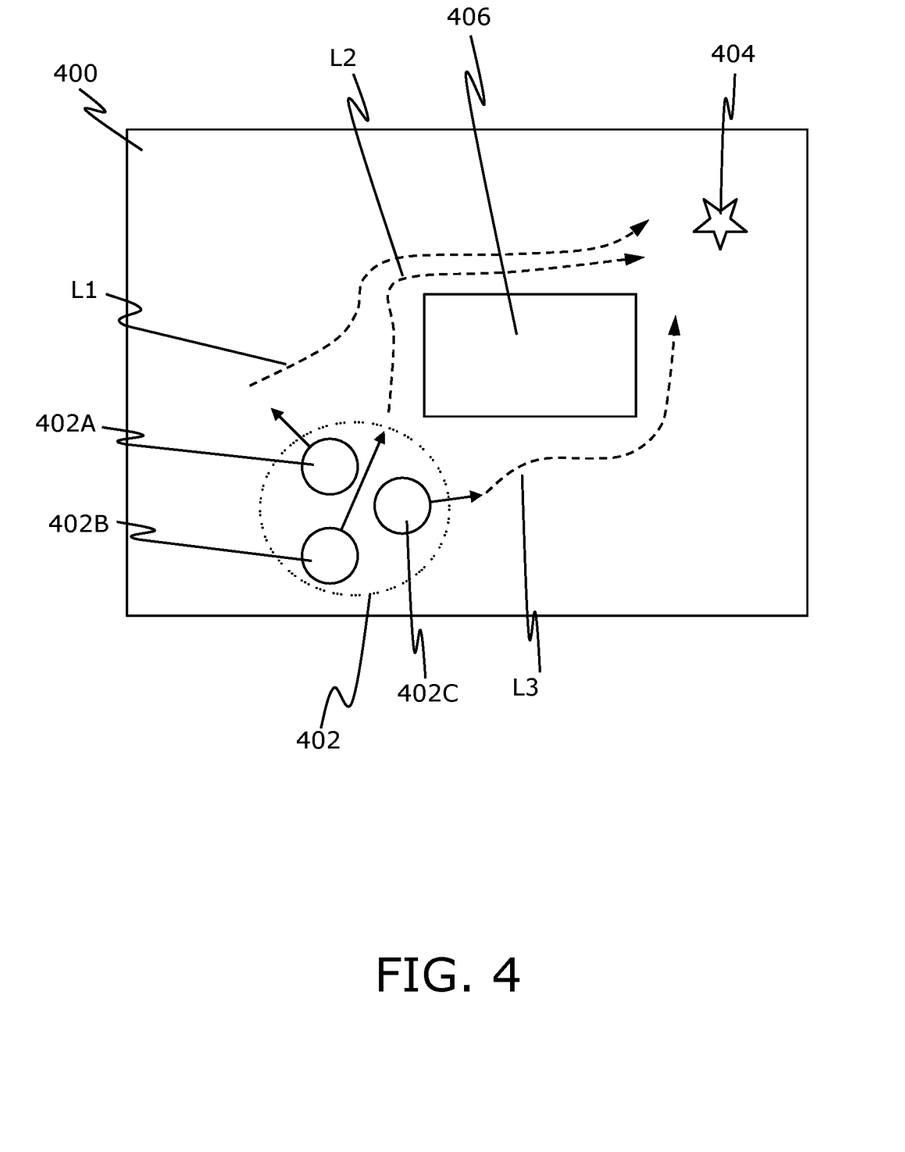
FIG. 4 is a schematic illustration of a graphical user interface depicting an implementation scenario of the computer-implemented method incorporating randomized movement control, in accordance with an embodiment of the present disclosure.

Referring to FIG. 4, illustrated is a schematic illustration of a graphical user interface 400 depicting an implementation scenario of a computer-implemented method incorporating randomized movement control, in accordance with an embodiment of the present disclosure. As shown in FIG. 4, the graphical user interface 400 depicts given objects 402A, 402B and 402C of the at least one group of objects 402 being randomized to move in different directions (shown as dashed lines L1, L2 and L3, respectively) to reach the target area 404 in order to avoid the accumulation of the given objects 402A, 402B and 402C around the obstacle 406 while reaching the target area 404.

Figure 5A:
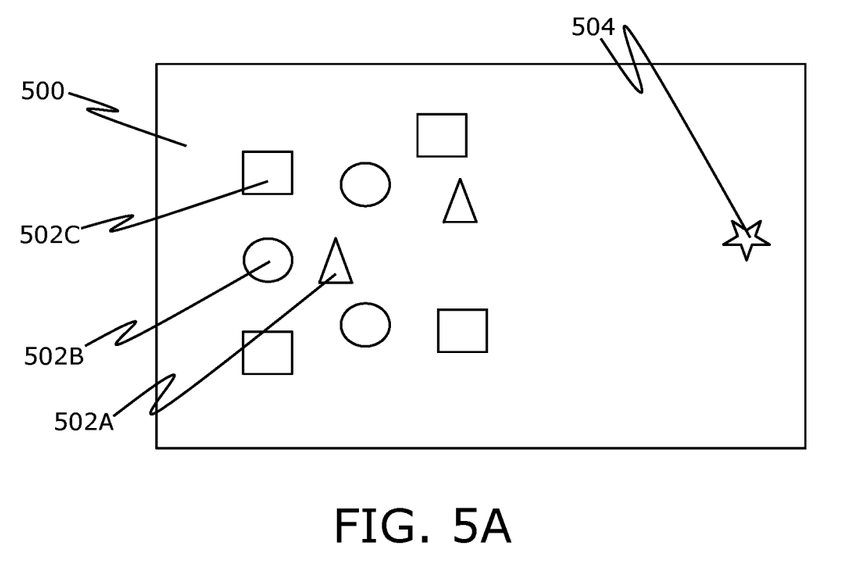
FIGS. 5A and 5B are collectively a schematic illustration of an implementation scenario of a computer implemented method incorporating randomized movement control, in accordance with an embodiment of the present disclosure.

Referring to FIGS. 5A and 5B collectively, illustrated is a schematic illustration of an implementation scenario of a computer implemented method incorporating randomized movement control, in accordance with an embodiment of the present disclosure. As shown in FIG. 5A, the graphical user interface 500 depicts a plurality of groups of objects depicted as groups 502A, 502B and 502C. Moreover, the graphical user interface depicts a target area 504.

Figure 5B:
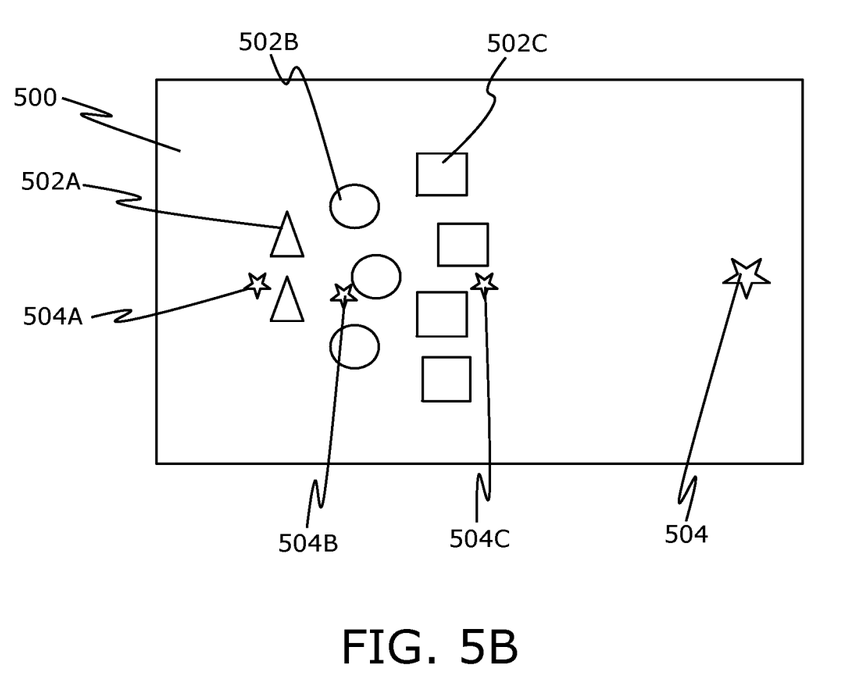

As shown in FIG. 5B, the graphical user interface 500 depicts the plurality of groups of objects 502A, 502B and 502C have been moved to respective intermediate target areas 504A, 504B and 504C, respectively. Moreover, from the respective intermediate target areas 504A, 504B and 504C, the plurality of groups of objects are to move to the target area 504.

Figure 6:
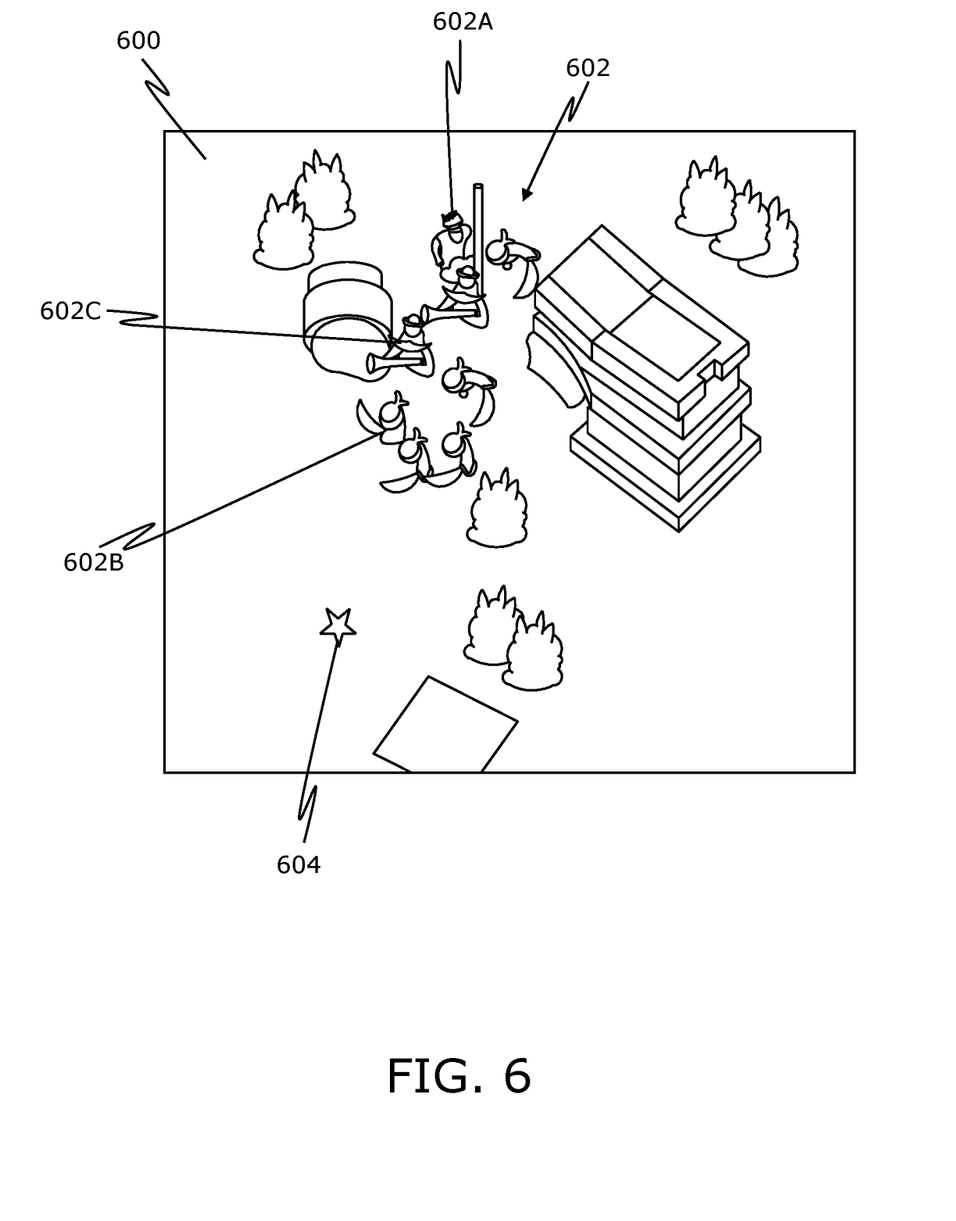
FIG. 6 is a schematic illustration of an implementation scenario of a computer-implemented method incorporating randomized movement control, in accordance with an embodiment of the present disclosure.

Referring to FIG. 6, illustrated is a schematic illustration of an implementation scenario of a computer implemented method incorporating randomized movement control, in accordance with an embodiment of the present disclosure. As shown in FIG. 6, the graphical user interface 600 depicts at least one group of objects 602 comprising a main object 602A and the remaining objects 602B and 602C. Herein, the main object 602A first starts to move to the target area 604 and the movement of the main object 602A is followed by the remaining objects 602B and 602C of the at least one group 602 while moving to the target area 604.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computer-implemented method comprising:
generating and displaying a graphical user interface on a display screen of an apparatus, a group of objects being presented on the graphical user interface;
receiving a request to move the group of objects from a starting location on the graphical user interface to a target area on the graphical user interface;
detecting at least one obstacle in a path of the group of objects between the target area and the starting location;
automatically generating a single instruction to control movement of individual objects of the group of objects in a randomized manner from the starting location towards the target location by applying random variable parameters to the individual objects, wherein the random variable parameters applied to respective ones of the individual objects are different; and wherein the random variable parameters include a start time of movement, an initial direction of the movement, an initial speed of the movement, and an initial distance of travel;
identifying one object from the group of objects as a main object to which no random variable parameter is applied;
executing the instruction to control the movement of each of the individual objects from the starting location towards the target location starting with the main object and followed by remaining objects in the group of objects;
determining that respective ones of the remaining objects have moved the initial distance of travel;
changing the direction of movement of the respective ones of the remaining objects towards the target area; and
wherein the remaining objects reach the target area following the main object.

2. The computer-implemented method according to claim 1, wherein the method further comprises randomly selecting the initial speed of the movement from a predefined range of speeds.

3. The computer-implemented method according to claim 1, wherein the respective ones of the remaining objects move in a different initial direction, wherein the method further comprises:
determining a range of directions in which the respective ones of the remaining objects can start moving based on relative positions of the target area, the at least one obstacle and other respective ones of the remaining objects.

4. The computer-implemented method according to claim 1, wherein the instruction are generated to control the movement of the remaining objects in a manner that the respective ones of the remaining objects reach the target area in a predefined order.

5. The computer-implemented method according to claim 1, wherein a plurality of groups of objects comprise the group of objects, and wherein the method further comprises:
assigning respective intermediate target areas to the plurality of groups of objects, wherein objects in a given group of the plurality of groups of objects first reach a given respective intermediate target area, and then move from the given respective intermediate target area towards the target area.

6. The computer-implemented method according to claim 5, further comprising dividing a plurality of objects presented on the graphical user interface into the plurality of groups of objects, based on at least one of: a distance of an object in the plurality of objects from the target area, and a signal strength of a sensor of the object in the plurality of objects.

7. A computer program product comprising a non-transitory computer-readable storage medium having computer-readable instructions stored thereon, the computer-readable instructions being executable by a computing device comprising a processor to execute a method as claimed in claim 1.

8. The computer implemented method of claim 1, further comprising:
identifying an object from the group of objects that is not able to pass by the obstacle;
forming a second group with the identified object;
applying a second set of random variable parameters to the second group; and
executing the instruction to control movement of the object in the second group from the starting location towards the target location.

9. The computer implemented method of claim 1, further comprising:
identifying an object from the group of objects that is not able to pass by the obstacle;
forming a second group with the identified object;
identifying an intermediate area;
applying a second set of random variable parameters to the second group;

executing the instruction to control movement of the object in the second group from the starting location towards the intermediate area;
applying a third set of random variable parameters to the second group; and
executing the instruction to control the movement of the object in the second group from the intermediate area towards the target location.

10. An apparatus comprising:
a display screen; and
a processor configured to:
generate and display a graphical user interface on the display screen, a group of objects being presented on the graphical user interface;
receive a request to move the group of objects from a starting location on the graphical user interface to a target area on the graphical user interface;
detect at least one obstacle in a path of the group of objects between the target area and the starting location;
generate a single instruction to control movement of individual objects of the group of objects in a randomized manner from the starting location towards the target location by applying random variable parameters to the individual objects, wherein the random variable parameters are applied to respective ones of the individual objects are different; and wherein the andom variable parameters includes a start time of movement, an initial direction of the movement, an initial speed of the movement, and an initial distance of travel;
identify one object from the group of objects as a main object to which no random variable parameter is applied;
execute the instruction to control the movement of each of the individual objects from the starting location towards the target location starting with the main object and followed by remaining objects in the group of objects;
determine that respective ones of the remaining objects have moved the initial distance of travel;
change the direction of movement of the respective ones of the remaining objects towards the target area; and
wherein the remaining objects reach the target area following the main object.

11. The apparatus according to claim 10, wherein the processor is further configured to randomly select the initial speed of the movement from a predefined range of speeds.

12. The apparatus according to claim 10, wherein the respective ones of the remaining objects move in a different initial direction, wherein the processor is further configured to:
determine a range of directions in which the respective ones of the remaining objects can start moving based on relative positions of the target area, the at least one obstacle and other respective ones of the remaining objects.

13. The apparatus of claim 10, wherein the processor is further configured to:
identify an object from the group of objects that is not able to pass by the obstacle;
form a second group with the identified object;
apply a second set of random variable parameters to the second group; and
execute the instruction to control movement of the object in the second group from the starting location towards the target location.

14. The apparatus of claim 10, wherein the processor is further configured to:
identify an object from the group of objects that is not able to pass by the obstacle;
form a second group with the identified object;
identify an intermediate area;
apply a second set of random variable parameters to the second group; and
execute the instruction to control movement of the object in the second group from the starting location towards the intermediate area;
apply a third set of random variable parameters to the second group; and
execute the instruction to control the movement of the object in the second group from the intermediate area towards the target location.

15. A system comprising a server communicably coupled to a plurality of apparatuses, wherein the plurality of apparatuses are collaborating via respective graphical user interfaces, wherein the server is configured to:
receive, from a given apparatus, a request to move a group of objects presented on a graphical user interface of the given apparatus from a starting location on the graphical user interface to a target area on the graphical user interface;
detect at least one obstacle in a path of the group of objects between the target area and the starting location;
generate a single instruction to control movement of individual objects of the group of objects in a randomized manner by applying random variable parameters to the individual objects, wherein the random variable parameters assigned to respective ones of the individual objects are different, and wherein the random variable parameters include a start time of movement, an initial direction of the movement, an initial speed of the movement, and an initial distance of travel;
identify one object from the group of objects as a main object to which no random variable parameter is applied;
execute the instruction to control the movement of each of the individual objects from the starting location towards the target location starting with the main object and followed by remaining objects in the group of objects;
determine that respective ones of the remaining objects have moved the initial distance of travel;
change the direction of movement of the respective ones of the remaining objects towards the target area; and
wherein the remaining objects reach the target area following the main object.

16. The system according to claim 15, wherein the server is further configured to randomly select the initial speed of the movement from a predefined range of speeds.

17. The system according to claim 15, wherein the respective ones of the remaining objects move in a different initial direction, wherein the server is further configured to:
determine a range of directions in which the respective ones of the remaining objects can start moving based on relative positions of the target area, the at least one obstacle and other respective ones of the remaining objects.

18. The system of claim 15, wherein the server is further configured to:
identify an object from the group of objects that is not able to pass by the obstacle;
form a second group with the identified object;

apply a second set of random variable parameters to the second group; and execute the instruction to control movement of the object in the second group from the starting location towards the target location.

19. The system of claim 15, wherein the server is further configured to:

identify an object from the group of objects that is not able to pass by the obstacle;

form a second group with the identified object;

identify an intermediate area;

apply a second set of random variable parameters to the second group; and execute the instruction to control movement of the object in the second group from the starting location towards the intermediate area;

apply a third set of random variable parameters to the second group; and execute the instruction to control the movement of the object in the second group from the intermediate area towards the target location.

* * * * *